Sept. 12, 1939.　　　R. J. THERIAULT　　　2,172,571
VEHICLE
Filed Aug. 21, 1936　　　5 Sheets-Sheet 1
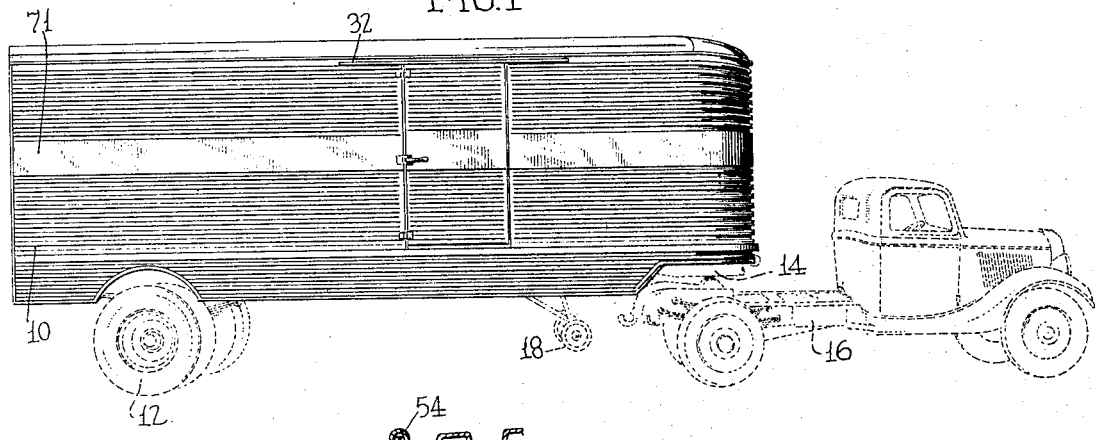
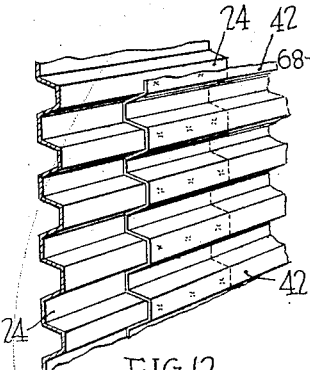
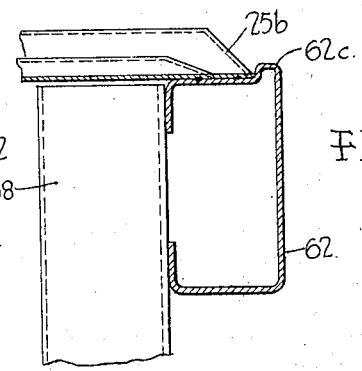
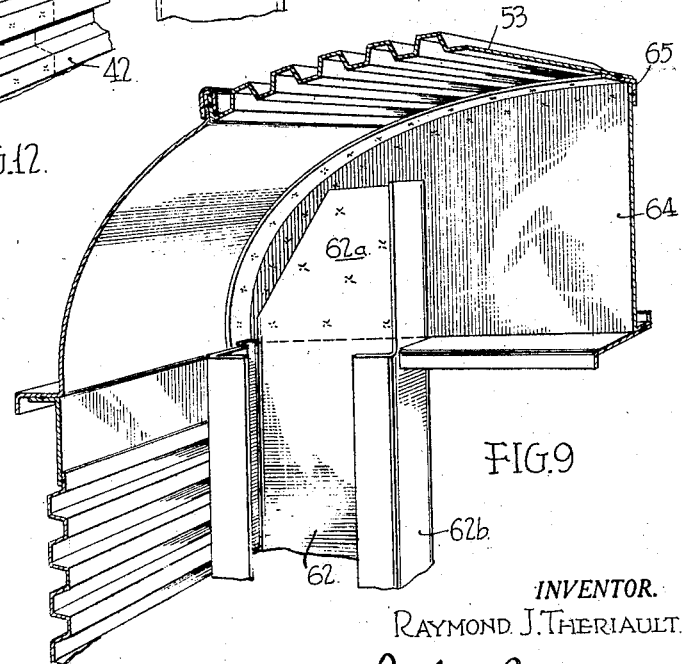
INVENTOR.
RAYMOND J. THERIAULT.
BY John P. Tarbox
ATTORNEY.

Sept. 12, 1939.   R. J. THERIAULT   2,172,571
VEHICLE
Filed Aug. 21, 1936   5 Sheets-Sheet 2
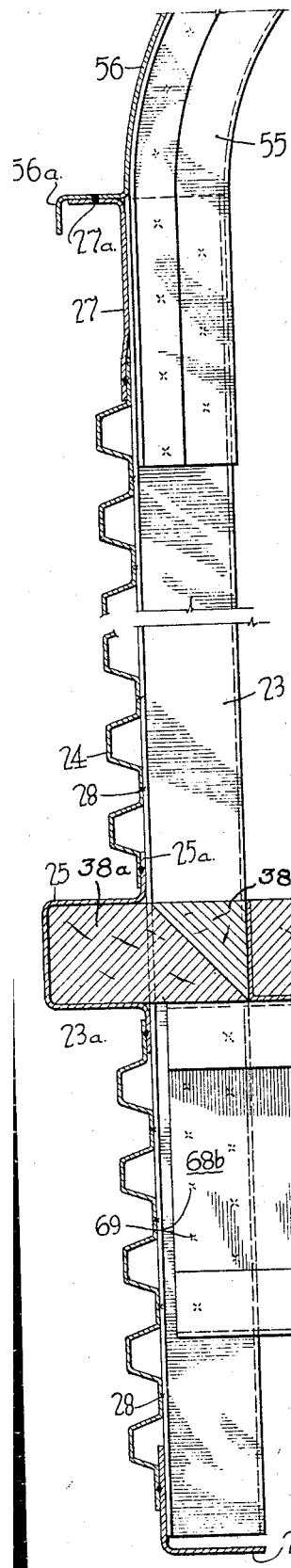
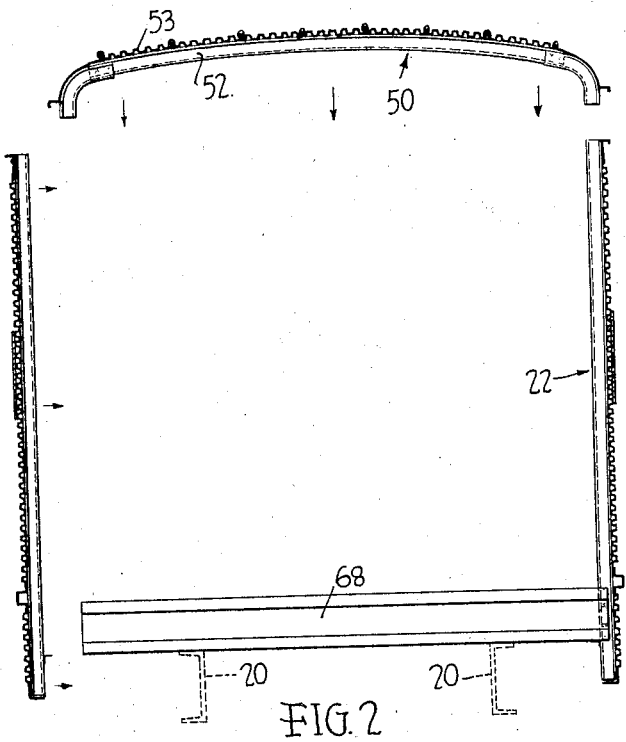
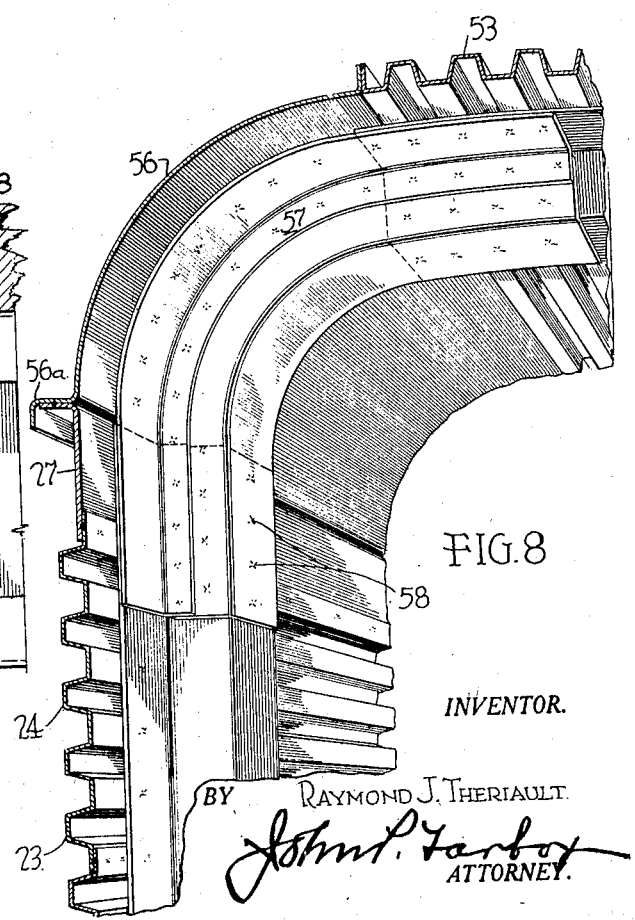
INVENTOR.
RAYMOND J. THERIAULT.
BY
ATTORNEY.

Sept. 12, 1939.　　　　R. J. THERIAULT　　　　2,172,571
VEHICLE
Filed Aug. 21, 1936　　　　5 Sheets-Sheet 3
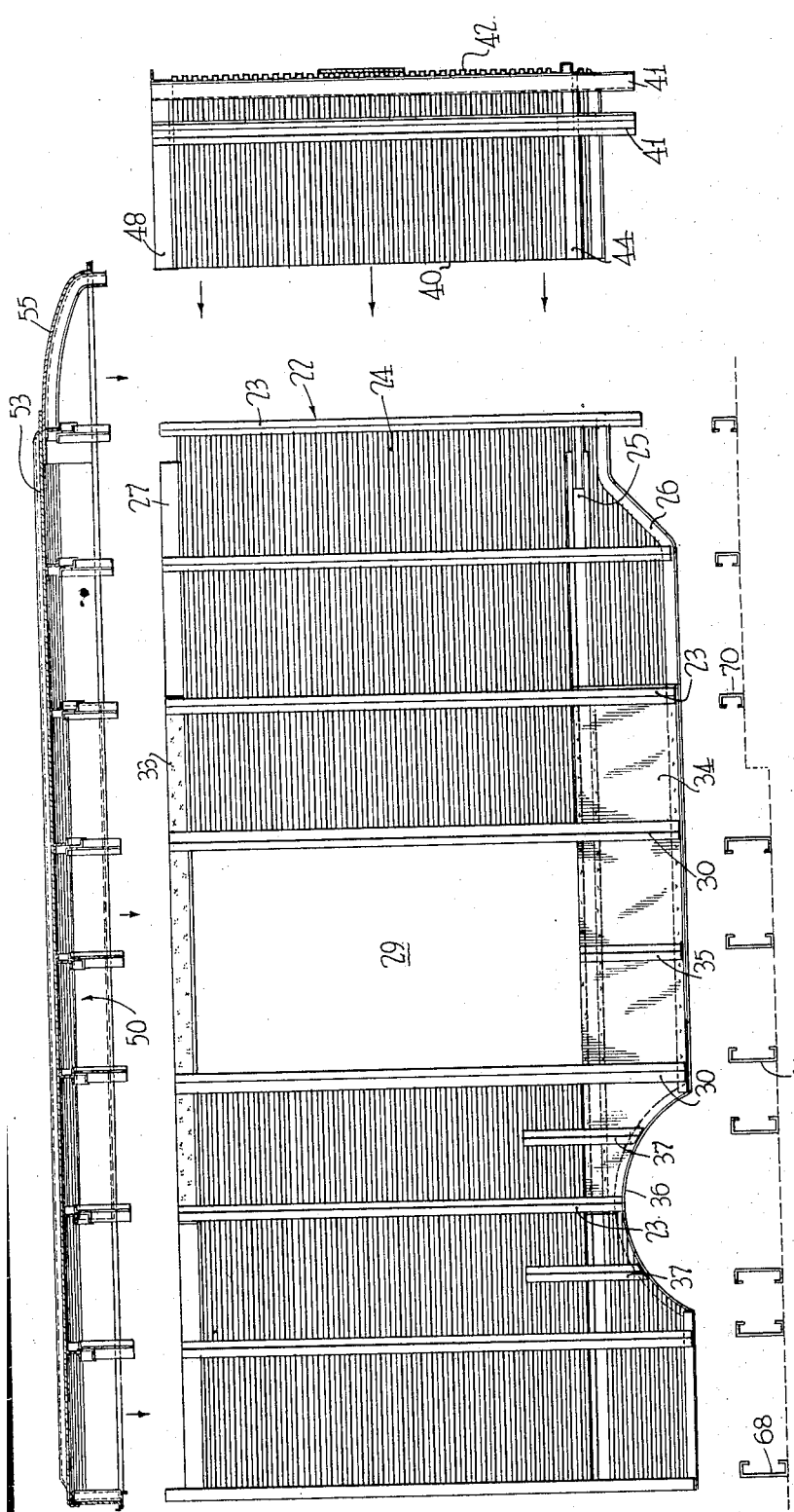
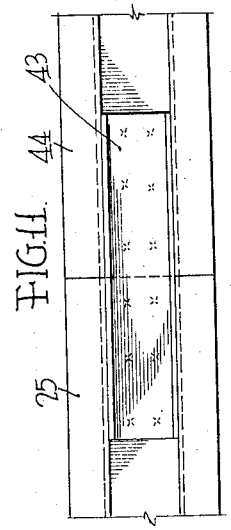
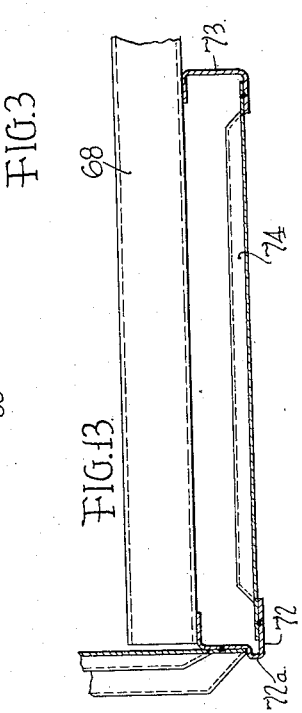
INVENTOR.
RAYMOND J. THERIAULT.
ATTORNEY.

Sept. 12, 1939.  R. J. THERIAULT  2,172,571
VEHICLE
Filed Aug. 21, 1936   5 Sheets-Sheet 4
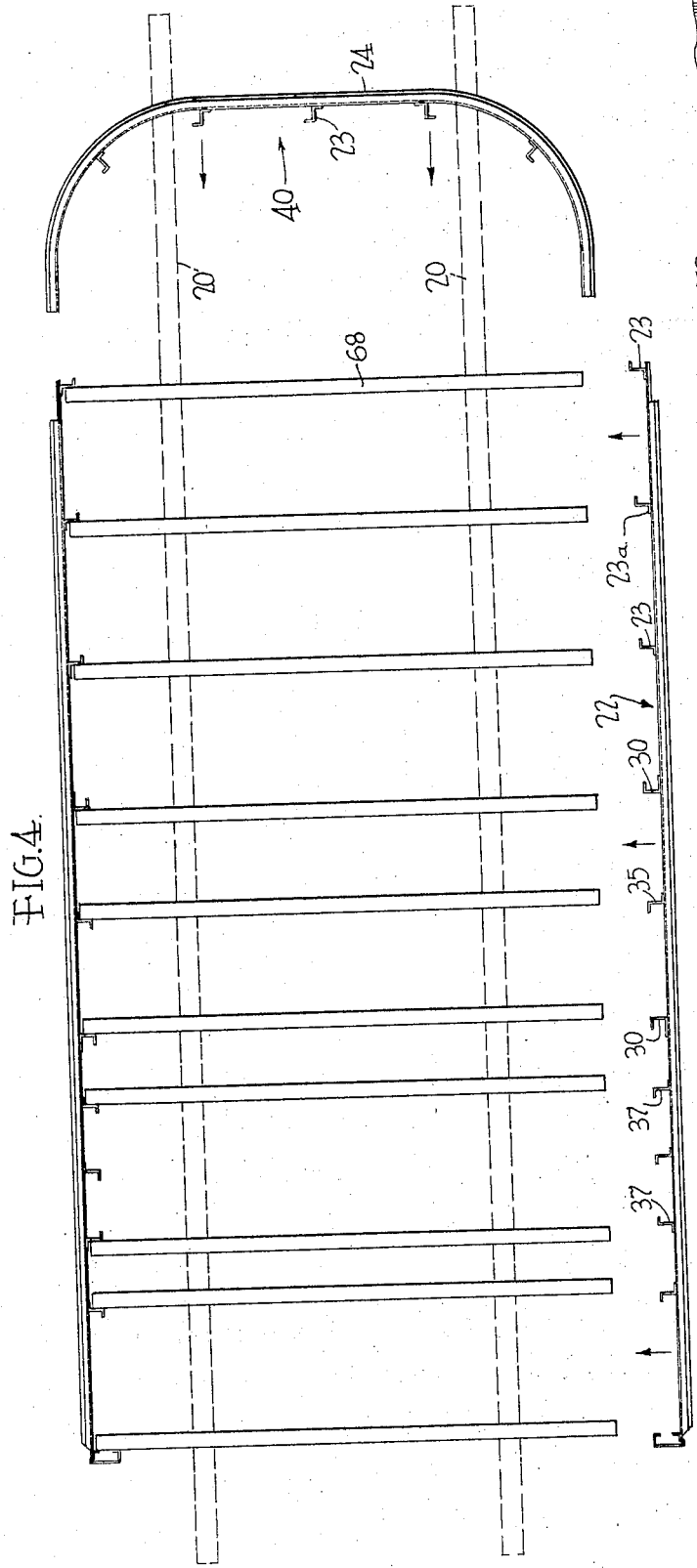
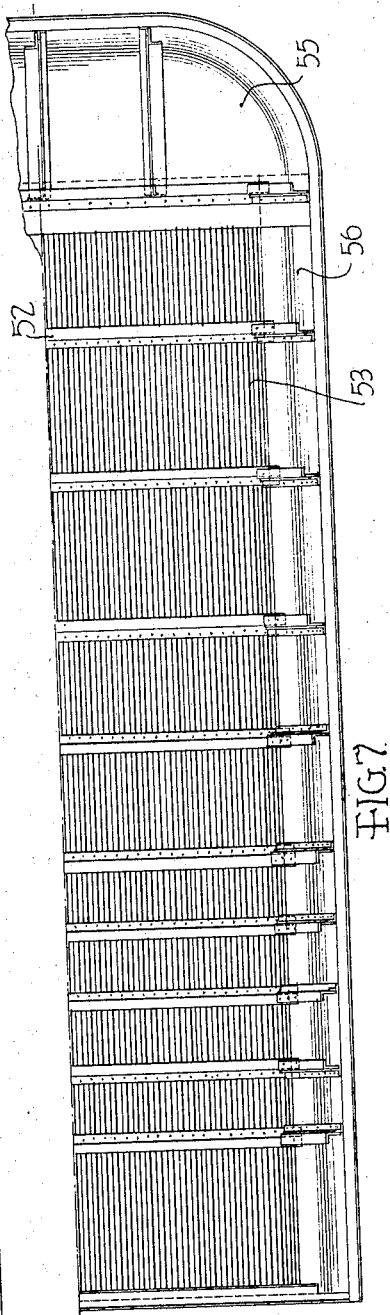
INVENTOR.
RAYMOND J. THERIAULT.
ATTORNEY.

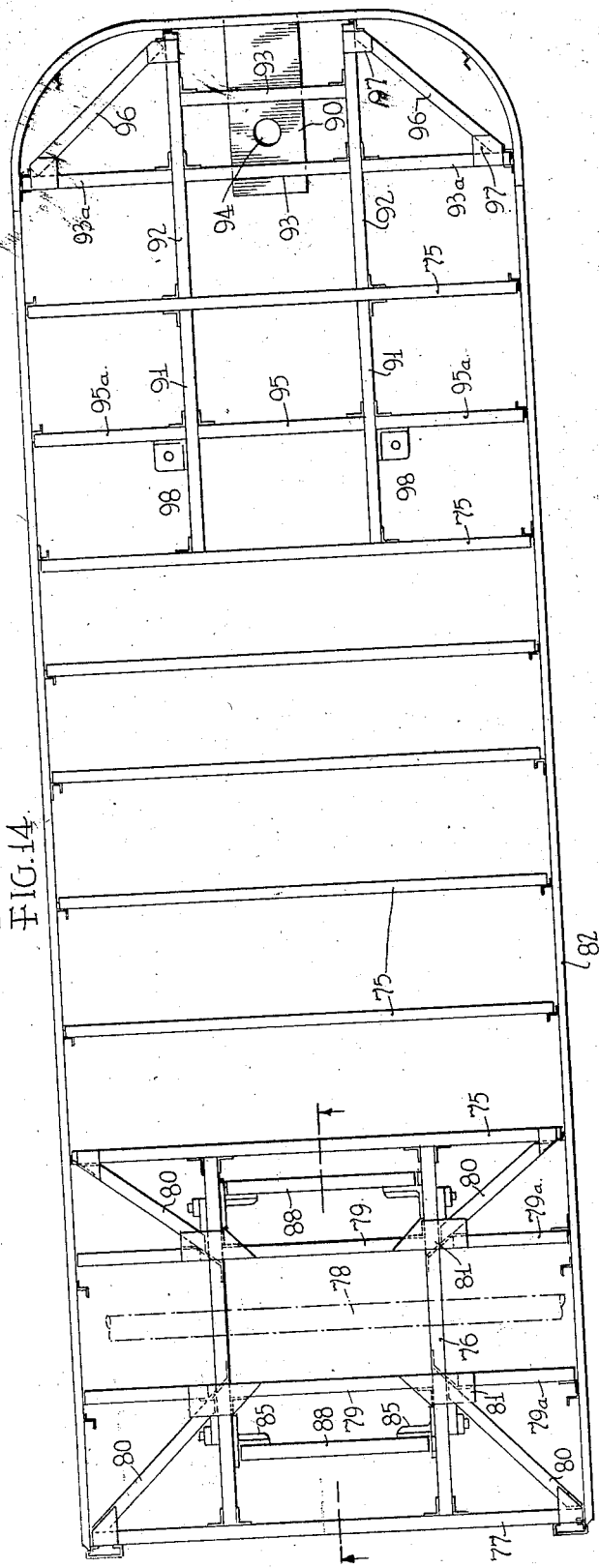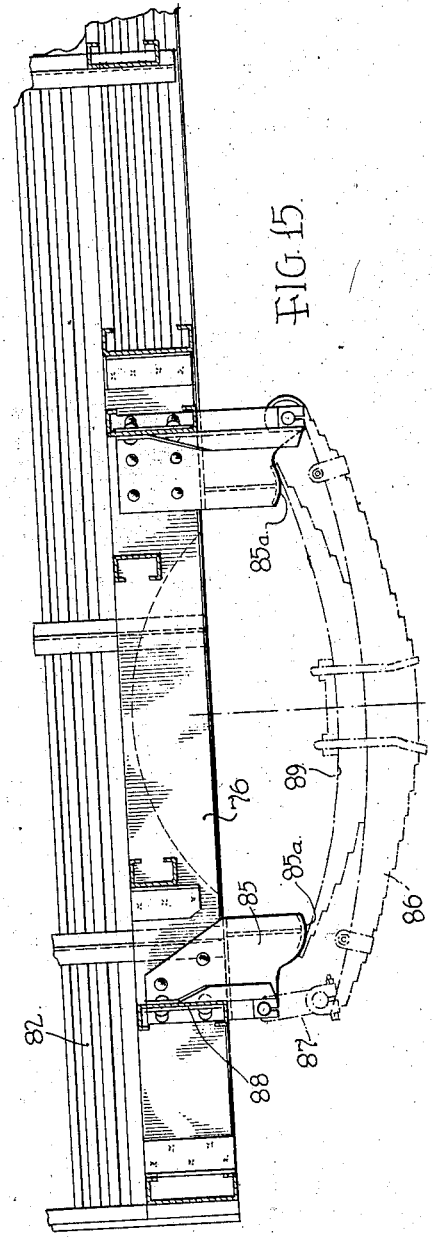

Patented Sept. 12, 1939

2,172,571

UNITED STATES PATENT OFFICE 2,172,571

VEHICLE

Raymond J. Theriault, Philadelphia, Pa., assignor to Edw. G. Budd Manufacturing Company, Philadelphia, Pa., a corporation of Pennsylvania Application August 21, 1936, Serial No. 97,111

21 Claims. (Cl. 296—28)

This invention relates to improvements in vehicle body construction and more particularly to one adapted for large size commercial bodies such as used for trucks, trailers, semi-trailers, buses, etc.

The operation of commercial vehicles such as trucks, trailers, buses, etc., depends for its success to a very large extent on the high available payload capacity in relation to the dead load of the body. In many jurisdictions, the maximum load is eighteen tons gross and heretofore bodies of sufficient strength have had a live load-dead load ratio of about four to one. It has been found, however, that each pound of dead load decrease with the equivalent live load increase is worth approximately one dollar per year to the operator. With such a high premium, it must nevertheless be considered that no sacrifice in strength can be tolerated which would offset this possible gain, and initial costs must also be kept in a competitive zone.

One of the principal objects of the invention is to provide a self-sustaining vehicle body of relatively high strength and low weight, for the most part consisting of metal sheets or strips which are rolled into angular shapes to form effective stress carrying members including car lines and sheathing, the members being joined together so that the body becomes a load carrying truss.

Another object of the invention is to provide a standardized type of sub-assembly side and roof unit construction for vehicle bodies, each unit comprising sheathing and transversely extending ribs or posts, and being adapted to be constructed on jigs and made of varying unit lengths by merely varying the number of ribs or posts and the length of the sheathing, such units having overlapping joint members to facilitate final assembly into a hollow body truss by welding.

A still further object of the invention is to provide a truss type of body construction for commercial vehicles in which the floor loads are carried by the sides and roof of the body between axle supports, the sides and roof being relieved of substantialy loads on the floor above the axle supports which loads are directly transmitted into the supports.

A still further object of this invention is to provide an effective plate girder construction substantially at the floor level of commercial vehicle bodies, which construction includes the cooperative arrangement of flooring and floor beams and extends across the body and into the respective rub rails whereby side shocks are resisted by the entire flooring and floor beams for a more general distribution of loading.

Another object of this invention is to provide a stress carrying sheathing for vehicle bodies which is free of curves or ripples imposed by loading conditions, such sheathing preferably consisting of strips of a high tensile material formed into relatively shallow corrugations, the strips overlapping and being joined in the overlapping portion as by continuous welding mechanism, into an effective beam having a substantial resistance to shear and bending moment.

Further objects and advantages of the invention will appear from the following description of a preferred form of embodiment thereof taken in connection with the attached drawings, in which:

Fig. 1 is a side elevation of a semi-trailer with the supporting wheels and tractor shown in dotted lines.

Fig. 2 is a diagrammatic end view of the body with one side assembled to the floor beams, the floor beams being supported on a jig.

Fig. 3 is a diagrammatic inside elevation of a typical side frame having a doorway, and the other related sub-assemblies.

Fig. 4 is a diagrammatic plan view of the body with a side frame assembled to the floor beams.

Fig. 5 is an enlarged vertical section adjacent a side post showing the connection of the floor beams and roof carline thereto, and the reenforcement of the rub rail.

Fig. 6 is a vertical section substantially like Fig. 5 on a smaller scale and taken in the doorway opening.

Fig. 7 is a partial bottom plan view of the roof sub-assembly.

Fig. 8 is a detail perspective view with parts in section showing the joint between the roof and side frame at the post.

Fig. 9 is a detail perspective view with parts in section, of the joint between the back, roof and side.

Fig. 10 is a detail view of the rear corner of the body showing the post in horizontal section.

Fig. 11 is an inside elevation of the plates comprising a joint between the bottom rail of the end unit and side unit.

Fig. 12 is a detail perspective view of the overlapping corrugations of the end unit and the side unit.

Fig. 13 is a detail horizontal sectional view similar to that shown in Fig. 10 of a modified form of rear corner panel.

Fig. 14 is a plan view of a modified form of underframe with the side frame attached thereto, and Fig. 15 is a detail elevation with parts in section showing the axle supporting brackets.

A specific form of embodiment of my invention is represented in Fig. 1 as a semi-trailer body 10 and it is of a hollow truss type as hereinafter described and carries the floor loading between the points of support rather than act merely as a superstructure. The points of support are the shackles of the springs (not shown) of the rear wheels 12 and the front fifth wheel support 14 which is adapted to be supported from a tractor 16. Supplementary wheels 18 hold up the body when the tractor is removed as is well known.

In this form of the invention, the body 10 may be mounted on a semi-trailer chassis (not specifically shown) which would have the wheels 12, support 14, wheels 18 and the necessary brake rigging, etc. A light weight chassis could be used, however, for the body is not only self-sustaining, but load carrying between the supporting zones over the rear axle and the fifth wheel support. In many cases the convenience of pre-assembled chassis construction justifies its use, but it is to be understood that if desired, all of the supporting and accessory mechanism may be mounted directly on the body as will also be shown hereinafter.

The body 10 comprises as the principal truss elements, a pair of side frames 22 and these are preferably made independently on a suitable jig and include the desired number of transverse posts or carlines 23 which are preferably of Z shape to facilitate welding of the sheathing 24 thereto. The sheathing is of relatively shallow corrugated type with the corrugations welded to the flanges 23a of the posts (see Fig. 5). The other flange of the post 23 is adaptable for securing an interior lining if desired, and the intermediate space may be used for insulation as in refrigerator bodies.

The corrugated sheathing 24 is suitably formed from relatively long strips and the marginal edges overlap as shown in Fig. 8 and may be joined in this overlapped portion by welding. The continuous long open seam is especially suitable for continuous automatic welding machines. While different materials are susceptible to use as sheathing "stainless" steel such as is commonly known as "18–8" is preferred for the sheathing, not only because it is entirely free from corrosion and need not be painted, but because it has a high tensile strength, thus requiring only light gauge sheets for the necessary strength in bending and shear with the corrugated cross section. The relatively shallow corrugations, reenforced by the Z posts, give an unusually strong beam effect and the side frames alone are sufficient to carry the maximum body load. Furthermore, the absence of large flat areas eliminates any tendency of the side frames to show ripples or waves under slight deflections.

The side frames are reenforced at the bottom edge by a longitudinally extending channel or rub rail 25, having its laterally extending flanges 25a welded to the flange 23a of the posts. Below the channel 25 and at the foot of the post, an angle member 26 having an inwardly projecting flange, completes the bottom of the side sheathing and effectively closes in the bottom of the posts. The top of the side frame preferably has an angle member 27, the outwardly projecting flange 27a of which acts as a support for the roof. The top angle member 27, rub rail channel 25 and bottom angle 26 thus serve not only as finish strips but also as principal chord members of the side frame truss with the posts 23 acting as struts and the sheathing 24 as a web. If the side frames have windows, as in bus construction, the upper and lower mouldings may be used as intermediate chord members.

The side frame shown in Fig. 3 is a specific form in that it is provided with a doorway 29, the doorway being placed between suitable posts 30 which as shown in Fig. 4, are preferably of channel shape to afford adequate jamb support for the door (not shown). For standardization, the channel door posts 30 are placed a fixed distance from the front of the body and will equally as well support a continuous side sheathing, if the doorway is unnecessary. The additional elements for a side frame having a doorway and not necessary on the doorless type are the rain gutter channel 32 and additional reenforcing plates 33 and 34 (see Fig. 6), respectively, above the top and below the doorway opening which assist in transferring the stresses across the doorway opening. These plates are of such capacity that the full body load may be concentrated in the doorway. Post 35 is of stub type below the doorway rather than of full length as required with doorless frames, and aids to reenforce the sheathing as well as support the transverse floor beam attached thereto.

With a deep side frame it is desirable to cut a recess 36 for the wheels, and it is preferably placed between the two bays next adjacent a full end bay. It will be noted that the bays, which is the space between posts, are all preferably of a unit width and in order to increase the length it is merely necessary to add an additional post and cut the side paneling the necessary additional length. Stub posts 37 are conveniently used to reenforce the side sheathing adjacent the wheel well 36, and to support the floor beams attached thereto, thereby reducing the floor span.

The front end construction 40 is similar in structure to the side walls and similarly has a material truss reaction as the loads on the floor beams are in part transmitted through it to the chassis rails 20. It has vertical posts 41 and sheathing 42 similar to those in the side frames and may also be built as a unit on a jig. It is rigidly joined to the side wall construction at the top and bottom rail by interlocking plates, the bottom plate connection being shown in detail in Fig. 11. As the bottom or rub rail 25 is a channel, it is relatively easy to insert a supplementary channel or gusset plate 43 into the rub rail 25 of the side frame and similar rub rail 44 of the front end, and then weld the respective sides to form a rigid joint. The posts 41 overlap the chassis on which the body is supported and are joined to the chassis by suitable angle members (not shown).

The corrugations of the front end sheathing 24 overlap the corrugations of the side frame sheathing 42 when the front end construction is brought into assembled position as particularly shown in Fig. 12 with the effect of a continuous plate around the corner of the body. The corrugations are welded at their bases and tops, forming a complete closed and rigid construction. It is to be understood, however, that this front end unit may also be built up rather than be constructed on a jig where the number required does not justify the set up expense.

The interior of the roof 50 is shown in elevation at the top of Fig. 3 and in plan in Fig. 8.

Similar to the side frames it is of a generally flat truss type including a plurality of carlines 52 preferably of Z shape extending transversely of the roof and being joined by a plurality of longitudinally corrugated plates 53 which conveniently extend the full rectangular length of the roof being welded to each other into an integral unit. The joints may be conveniently closed by any suitable means such as by the caps 54 as shown in Fig. 6 or by other suitable means. Building the roof, as well as the side frames on suitable jigs is of particular advantage in that the work can be carried out from the floor and with the minimum interference of labor. Such advantages are particularly important with the roof.

The forward part of the roof is conveniently a smooth dome-shaped plate 55 and for attractive appearance the curved quarter sections 56 of the roof may also be smooth plates. The quarter section plates are preferably provided with outward and downwardly turned flange elements 56a which as shown in Fig. 6 constitute the effective manner of attaching to the side frame angle 27a heretofore described.

The carlines 52 are provided with carline knees 57 projecting beyond the edge of the roof and being partially covered by the substantially smooth curved quarter section 56, such knees extending into overlapping relation with the side posts 23 and being welded at 58 along the web and inside flange portion of the post. This quarter section 56 is also conveniently provided with a curved reenforcing plate 59 in this region over the doorway for additional reenforcement and stress transfer (see Fig. 6). Although the side frames alone are normally constructed to carry the entire load in the body, the extreme rigidity of the roof makes for a greater strength and more rigid body. The roof carlines and the covering are especially beneficial in this respect.

The rear end structure of the vehicle body which is conveniently built with the side frame includes a pair of corner panels, one form of which as shown in Fig. 9, is a relatively wide, one piece channel member 62 extending upwardly from the end floor beam to the closing plate 64, which joins with the roof plates 53 through the medium of an angle 65. The upwardly projecting channel member 62 is welded in its overlapping portion 62a to the closing plate 64 and strengthens the entire end wall construction and permits the rear doors, not shown, to be suspended from its jamb face 62b. The size of the doorways on the end of the body control the web width of the channel, but the doors are preferably of a standard size both on the side and in the back, thus facilitating assembly. A bead 62c on the channel 62 acts as a finishing strip for the corrugations of the side plates and rub rail 25, the end of the rub rail being conveniently closed by forming the bottom of the channel into a wedge or chisel shape closure 25b which extends to the bead 62c.

The initial assembly of the body units is not only to facilitate ready fabrication of the particular parts, but also to render final assembly simple, quick and effective for welding. The side frame units 22 for example, have projecting web portions of the posts 23 which serve as overlapping portions to which the extension portion 68b of the floor beams 68 are secured. The joint is open for welding mechanism and with equally spaced floor beams and posts, rapid assembly is possible between web 68a of the floor beam and the web of the post. Variations in the depth of the floor beams 68 and 70 is immaterial as far as the joint is concerned, beams 70 being shallower to permit free turning movement of the tractor, etc. Plate 71 may be added after assembly of the sides and end units for the purpose of a letter board or other decorative effect.

After the side units 22 are securely welded to the floor beams, the front end unit 40 is appropriately brought into position and the extensions of the rail members are secured together. Thereafter the sheathing 42 is anchored to the sheathing 24 of the side frame to form an entirely closed body panelling. The resultant joint between the sheathing is appropriately welded with a final appearance such as shown in Fig. 12 and heretofore described. While this is the preferred step of assembly, it is possible to build up the front end unit after the roof is attached as heretofore described.

Final assembly of the roof is accomplished by telescoping the carlines over the side wall and end wall units. The carline knees each overlap their respective posts and are welded thereto. Subsequently the adjacent flange portions 27a and 56a are joined by welding as shown in Fig. 5 and the rear cover plate 64 is secured to the end panel member 62 and the roof becomes a rigid supporting member of the body. Initial subassembly of the roof with extending carline knees is thus effective for standardization, economy of labor and rapidity of final assembly. If desired, each sub-assembly may be shipped in its knockdown state as each is rigid and strong.

The floor 38 extends into the rub rails 25 as shown in Fig. 5 and not only reenforces the rub rails between floor beams but serves as an effective plate girder at the top of the floor beams. If a reenforcing angle 39 is used, the floor pieces 38a and 38b are used for mutually locking each other in place and sealing the corner against inflow of dust or moisture. The main floor may then be installed between the respective angles for more rapid assembly. Notching out the flooring for the posts is very effective, however, and prevents accidental damage to the rub rail and associated parts. A corrugated metal floor could also be used, either the wood or metal floor being secured to the floor beams to make a rigid construction.

Modified forms of end panel may be found desirable as for example when but a single door is contemplated. Such a construction may be arranged as shown in Fig. 13, in which two angular shaped post members 72 and 73 are secured to the end floor beam 68 as by welding, such members having a plurality of corrugated or flat closing sheets 74. As in the former construction, the corner post members 72 may have a finish bead 72a to terminate the side sheathing. This is especially desirable with refrigerator bodies which commonly have reduced width doorways.

In this first form of embodiment of my invention, the floor beams 68 and 70 are conveniently of C shape and are merely suspended from the side frames with the floor load reactions distributed through the side frames and thence into certain floor beams to the chassis rails of the semi-trailer chassis adjacent the supporting points, while some of the load above the supporting points is transmitted directly into the supports. As hereinafter described, a modified form of embodiment of the invention relates to an integral frame type of construction in which the supporting axles, etc., are mounted directly on the floor beams.

As shown in Fig. 14, the transverse floor beams 75, which are preferably of C shape, are similar to those shown at 68 in Fig. 4, and they extend substantially across the body with but few exceptions. Adjacent the rear of the body, a plurality of longitudinal beams 76 which are also conveniently of channel or C shape, extend for several bays, usually to the end floor beam 77 and in any event, nearly equally on each side of the supporting axle generally indicated in dotted lines at 78. As these beams 76 are continuous, and to avoid notching at the intersection, supplementary and relatively short transverse beams 79 extend between the longitudinal beams 76, while transverse extension beams 79a extend between the longitudinal beams and the side of the frame. All of the beams are in the same plane and may be joined by gussets 81, brackets, etc. as desired.

The nature of the flooring directly affects the arrangement of the floor beams and with a typical longitudinal plank floor, additional diagonal stiffeners 80 are used. These diagonals extend substantially radially outward in the plane of the floor beams from the intersection of beams 76 and 79 to the side frame as represented by side plate 82 of the side frame sheathing. The combined longitudinal planking and diagonals form an effective queen post truss which includes the end floor beam 77, last floor beam 75, one of the transverse beams 79 and the diagonals 80 and this is especially effective in resisting collision shocks as well as brake reactions or other tendency of the frame to twist.

Corrugated metal flooring, having longitudinal corrugations has such a resistance to twisting when anchored to the floor beams that the diagonals 80 may be dispensed with, but transverse beams 79a are used to reduce the span. With plywood flooring, the supplementary transverse beams 79a need not be used although the diagonals 80 assist in resisting horizontal stresses.

In each case, all of the floor beams used are in a common plane and bending moment reactions are reduced to a minimum with a resultant approach to an effective plate girder in the underframe.

The mounting of the axle 78 to the body underframe is shown in Fig. 14 in plan and Fig. 15 in elevation. Shackle brackets 85 to which the main spring 86 or its shackle 87 are secured are mounted below the floor beams 76 with each bracket of a pair being joined by a stabilizing arm 88. The brackets 85 may have helper spring projections 85a to cooperate with helper spring 89. The floor loading over the rear axle 78 and substantially over the entire span of floor beams covered by the area of the diagonals 80 is thus carried by the floor beams 76 directly into the springs and thus into the axle without having any substantial load passing into the side frames of the vehicle body.

In a similar manner a large proportion of the floor load in the front part of the body is directly transmitted to the fifth wheel supporting plate 90 or similar supporting axle, inasmuch as transverse floor beams 75 are joined by longitudinal floor beams 91 and 92 and supplemental transverse beams 93 extend between the longitudinal beams 92 on each side of the center pin of the fifth wheel plate which is approximately at the point 94. Supplemental beam 95 extends transversely between longitudinal beams 91, and extensions 93a and 95a complete the floor span by extending to the side frame. Diagonals 96 are also used and extend from the front transverse extension beams 93a to the front end of the longitudinal beams 92 for the necessary rigidity and transfer of stresses. Gussets 97 are used at the junction of adjacent floor beams to further strengthen the joint inasmuch as channel shapes are used and the greatest strength is possible by such a joint rather than attempting to notch one channel for the other.

In this form of integral frame body, the floor beams 75 which are of full width, distribute their effective floor loads into the body frame as in the first construction and the body thus acts as a truss between supporting points and as a load distributor to the spring supports and fifth wheel plate. The removal of some load from the side frame is thus an important feature and is of especial advantage at the end points where the shear would otherwise be maximum.

Although the details of the supplementary wheel supports 98 is not shown in detail, they are conveniently secured to the extension beams 95a and to the longitudinal beams 91 so that the body load is distributed through the two transverse floor beams 75 on each end of beams 91. It is, of course, to be understood that in this construction, the brake and other accessory equipment is suitably carried directly on the floor beams in appropriate positions.

While reference has generally been confined to a commercial vehicle such as a semi-trailer, similar loading conditions occur in passenger buses and such a body could be built equally as well and embodying all of the principal features of the previously described construction. Modifications necessary would be to reduce height, increase length and provide the necessary windows for observation purposes. Double Z posts serve satisfactorily for window attachments, making a symmetrical arrangement. If desired, combination sleeping car berths may also be used by which the seats can be converted for sleeping purposes, it being understood, that the interior appointments may vary in accordance with the use to which the vehicle is placed. The body is not limited to trailer or semi-trailer types, but may be for a truck if desired. Additional reenforcement is not necessary, even on longer bus bodies due to the comparatively lower weight carried but additional longitudinal rails which are decorative as well as strengthening, especially when placed above and below the windows may be used.

The use of especial alloys is not necessary for a weight reduction, although as a preferred construction, "stainless" steel having a general chemical formula of 18% chromium and 8% nickel has been used with especial advantage. With the overlapping members welded to each other by "Shotweld" processes which prevent destruction of the material by corrosion, it has been possible to change the payload-deadload ratio of 4 to 1 to 6 or more to 1 with the 18 ton maximum gross load. The increase in revenue load has thus been very substantial and with a greater available strength than in the prior metal or composition bodies.

While preferred forms of embodiment of the invention has been shown and described herein, modifications may be made thereto and it is therefore desired that a broad interpretation be given to the invention within the scope and spirit of the disclosure herein and as set forth in the claims appended hereinafter.

What I claim is:

1. A vehicle body fabricated out of separate roof and side subassemblies, each of which is an effective plate girder including longitudinally spaced angular cross section carlines and longitudinally extending for the most part corrugated sheathing connecting the respective longitudinally spaced carlines, carline knees secured to and overlapping the ends of the roof carlines and extending into overlapping relation with the longitudinally spaced carlines of the side subassemblies, said carline knees forming final assembly joints between the carlines of the side subassemblies, and the roof subassembly and the sheathing of said side and roof subassemblies being also formed in their margins with overlapping outwardly projecting flanges forming final assembly joint portions joined together in final assembly, and means to join the bottom portion of the side subassemblies.

2. A vehicle body fabricated out of separate longitudinally extending sub-assemblies of substantially the length of the body and including a roof and side wall structures, each of said subassemblies being an effective plate girder, the side sub-assemblies including longitudinally spaced vertical post carlines of angular cross section, the roof sub-assembly including a plurality of longitudinally spaced transverse carlines having substantially the same longitudinal spacing as the vertical carlines and having substantially the same cross section, carline knees initially secured to the ends of certain of the carlines and extending substantially beyond the ends of said carlines, said carline knees being secured to the carlines of other sub-assemblies in final assembly by welding, said carlines and carline knees being joined by and the body being covered by longitudinally corrugated sheathing welded thereto and capable of resisting shear and bending moment stresses, the sheathing of said subassemblies being formed with final assembly joint portions comprising outwardly projecting flanges overlapping and welded together in final assembly, and means to join the bottom portion of the side wall structures.

3. A vehicle body fabricated out of separate longitudinally extending subassemblies of substantially the length of the body and including a roof and side wall subassemblies, the side and roof subassemblies including a plurality of longitudinally spaced transverse carlines of angular cross section having substantially the same longitudinal spacing, metal sheathing secured to said carlines, means subassembled with the roof to secure the roof carlines to the side wall carlines, sheathing on said securing means and carlines reenforcing the side wall elements, said sheathing on the subassemblies being formed with outwardly projecting flanges forming final assembly joint structures directly spot welded together in final assembly, and a curved front end wall subassembly including vertical posts and sheet metal sheathing, said front wall sheet metal sheathing overlapping the ends of the sheet metal sheathing of the respective side wall elements and being secured thereto by welding.

4. A vehicle body including a plurality of side walls having longitudinally and laterally extending members mutually cross bracing each other and jointly forming a load supporting truss member, a roof including a plurality of longitudinally and laterally extending elements mutually cross bracing each other and jointly forming a load supporting truss member, the longitudinally extending members of the side walls and roof serving as sheathing and the laterally extending members being joined together to form a hollow body truss, and an underframe consisting of a plurality of transversely extending vertically deep beams secured directly to the laterally extending elements of the side wall trusses to join the respective side wall trusses together substantially throughout their lengths.

5. A self-sustaining vehicle body including a plurality of side walls having longitudinally extending corrugated sheathing and laterally extending members welded to said sheathing and jointly forming a closed effective plate girder, a roof including a plurality of longitudinally and laterally extending elements mutually cross bracing each other and adapted to form a self-sustaining plate girder, an underframe consisting of a plurality of transversely extending vertically deep beams, said beams being secured directly to the laterally extending elements of the side wall trusses to join the respective side wall trusses together substantially throughout their lengths, and a front end wall element including vertical posts and corrugated sheet metal sheathing, said sheet metal sheathing overlapping the ends of the sheet metal sheathing of the respective side sub-assemblies and being secured thereto by welding.

6. A vehicle body adapted to be mounted on a semi-trailer chassis having a fifth wheel supporting zone, a rear axle supporting zone and an intermediate zone therebetween and having supporting points in the fifth wheel and rear axle zones, which comprises a plurality of vertically deep transverse floor beams, vertical posts secured directly to said floor beams substantially throughout the length of the body, and longitudinally corrugated sheathing secured to said posts, said sheathing and posts constituting a side truss adapted to directly support the floor beams in the intermediate zone between the points of support in the rear axle supporting zone and the fifth wheel supporting zone.

7. A frameless vehicle body of the fully self-sustaining type which comprises side wall members including longitudinally corrugated sheathing and transverse carlines, a plurality of vertically deep transverse floor beams joining said wall members substantially throughout the length of the body and directly secured to said carlines and means on said floor beams to directly support said body, said supporting means including a reinforced floor framing bracing the transverse beams near the rear end of the body and means to support the other end of the body, said side wall units constituting relatively shallow and wide truss members.

8. A frameless vehicle body of the fully self-sustaining type which comprises side wall units including longitudinally corrugated sheathing and transverse carlines of angular cross section secured to the sheathing, a plurality of vertically deep transverse floor beams joining said wall members substantially throughout the length of the body and directly secured to said carline and means on said floor beams to directly support said body, said supporting means including a transversely and longitudinally reinforced floor framing bracing the transverse beams near the rear end of the body and means to support the other end of the body, said side wall units constituting relatively shallow and wide truss members.

9. A vehicle body of the class described comprising side walls, front end wall, underframe and roof, said side walls, end wall and roof including a plurality of sheets of corrugated metal and a plurality of longitudinally spaced carlines to which the respective corrugated plates are welded, a portion of the front end wall sheets extending in the direction of and overlapping the side wall sheets and being welded thereto, a portion of the roof carlines overlapping the side wall carlines and end wall carlines, said roof being integrally secured to the side walls and end wall by welding of the overlapping portion of the carlines, the underframe including floor beams of transverse C-shape truss members suspended from the side walls of the body and directly secured to said side wall carline substantially throughout the length of the body.

10. A side frame truss unit for a commercial vehicle body including longitudinally extending corrugated metal sheathing, transversely extending angular posts secured to the corrugations of the sheathing, said sheathing having openings therein between posts tending to reduce the efficiency of the truss and longitudinally extending plate means in addition to the sheathing substantially across the top and bottom of the opening and welded to posts on opposite sides of the opening to reinforce the unit adjacent said openings, said reenforcement constituting the truss of sufficient strength to sustain the maximum body payload concentrated at the opening.

11. A side frame truss unit for a commercial vehicle body comprising a plurality of longitudinally extending corrugated metal sheets, and a plurality of transversely extending angular posts, said posts being welded to the bottoms of the corrugations to make a rigid structure, said frame having a doorway opening tending to reduce the efficiency of the truss and means to reinforce the side frame adjacent said opening, including relatively heavy plates in addition to the corrugated sheathing secured to the posts above and below the doorway opening and extending across several posts on each side of the doorway opening and secured thereto, said reenforcements constituting the side frame of sufficient strength to withstand a maximum payload concentrated at the doorway opening.

12. A side frame sub-assembly unit for a vehicle body including a plurality of transversely extending post members of angular cross section, a plurality of separate relatively narrow longitudinally corrugated sheets each of which is secured to a plurality of the post members and each having a flattened end margin, a part of said posts being normal to the corrugations and reenforcing them, a part of said posts being exposed by which other body elements may be secured to said side sub-assembly, and an end panel extending inward from the side sub-assembly overlapping and secured to the inner face of the flattened end margins of said sheets and having an outwardly projecting bead to cover the ends of the corrugated sheets.

13. A side sub-assembly for a vehicle body including a sheathing of corrugated sheets, a plurality of transversely extending post members, some of which are of Z-cross section and all of which have lateral flanges and spacing webs, said corrugated sheets being secured to one of the lateral flanges, the other flange being exposed so that other body elements may be secured therethrough to said side sub-assembly, said side sub-assembly having a plurality of longitudinally extending angular cross section members serving as sheathing and arranged at top and bottom, respectively, and serving as chords of a truss in which the sheathing and posts serve as web members, the top member having a laterally projecting arm serving as a final assembly joint structure.

14. A side wall sub-assembly truss unit for a commercial vehicle body including longitudinally extending corrugated metal sheathing, transversely extending angular posts secured to the corrugations of the sheathing, a top chord member serving as sheathing and having an outwardly projecting flange, said flange being adapted to resist longitudinal stresses and act as a part of a final assembly joint with a roof, a lower chord member of channel shape, adapted to resist longitudinal stresses and serve as a rub rail, and a rear panel forming part of said side wall sub-assembly formed on and transversely reenforcing said side wall sub-assembly, said panel including vertical channel members having an intermediate web portion.

15. A side wall for a vehicle body of the class described comprising a plurality of side frame sub-assembly units and an end frame sub-assembly unit, said units each having a plurality of vertical posts of angular cross section, and longitudinally extending longitudinally corrugated sheets integrally secured to one flange of the posts and forming a rigid structure resistant to shear and bending moment reactions, the corrugations of the sheets of the end unit having their side portions in alignment with and telescoping over the corrugations of the sheets of the side units and being secured in the overlapping portion whereby the sheets appear to be continuous around the end of the body.

16. A final assembly joint between a vehicle body roof sub-assembly and side frame sub-assembly in which each sub-assembly is provided with metal sheathing and transversely extending carlines welded thereto, a carline knee comprising a plurality of separate angles arcuately curved and initially secured to the carline of one sub-assembly, a curved quarter section sheathing secured to the carline knee, said carline knee extending beyond the sub-assembly to which attached and overlapping the carline of the adjacent sub-assembly, said carline being welded in the overlapping portion, the side and roof sheathing having angular margins providing outwardly extending overlapping flanges forming final assembly joint structures joined together throughout the overlap in final assembly.

17. A final assembly joint at the rear upper corner of a vehicle body between the side frames and roof thereof, said side frames terminating in rear panels of channel shape, the roof terminating in an angle of arcuate shape and a back panel between the rear panels, said back panel being secured along the flange of the roof angle and to the web of the end panels, portions of the side frames abutting portions of the roof and being joined together by welding the abutting portions.

18. A vehicle body comprising a pair of inwardly presenting channel shaped rub rails disposed longitudinally of the body, a plurality of spaced cross elements, and means extending into said rub rails and effectively extending across the body and being secured to the cross elements to serve as a plate girder in the plane of and between the rub rails, said means bracing the rub rails throughout substantially their longitudinal extent.

19. A vehicle body having sheet metal side frames and transverse floor beams, internally open rub rail channels adjacent the top of the floor beams and extending longitudinally along the outside thereof, and a flooring integrally secured to the floor beams and effectively extending into the rub rail channels and bracing the same throughout substantially their longitudinal extent.

20. A vehicle body including side and roof subassemblies each having transverse carlines of angular cross section joined by sheathing for the most part longitudinally corrugated, the transverse carlines of the roof structure being curved at the sides and extended down below the margin of the roof sheathing, and forming final assembly joint structures in this region for attachment to the top of the side subassembly carlines, the margins of the roof and side subassembly sheathing being flanged outwardly to form final assembly joint parts overlapping and joined together in the final assembly.

21. A roof subassembly unit for a vehicle body which comprises longitudinally extending sheathing, transversely extending Z-shaped carlines and carline knees extending through the curved side portions of the roof, said carline knees consisting of multiple angles welded together, each of said carline knees extending vertically beyond the roof sheathing a substantial distance to form final assembly joint structures for attachment to an adjacent side wall unit, the roof sheathing covering a major portion of said carline knees and formed in its outer margin with a longitudinally continuous outwardly extending flange forming a final assembly joint part for joinder to an adjacent side wall unit, and said carline knees forming with the sheathing applied thereto a truss structure adapted to enable the roof to carry a substantial portion of the loading on the body side walls with which it is associated in final assembly.

RAYMOND J. THERIAULT.